Patented Mar. 25, 1952

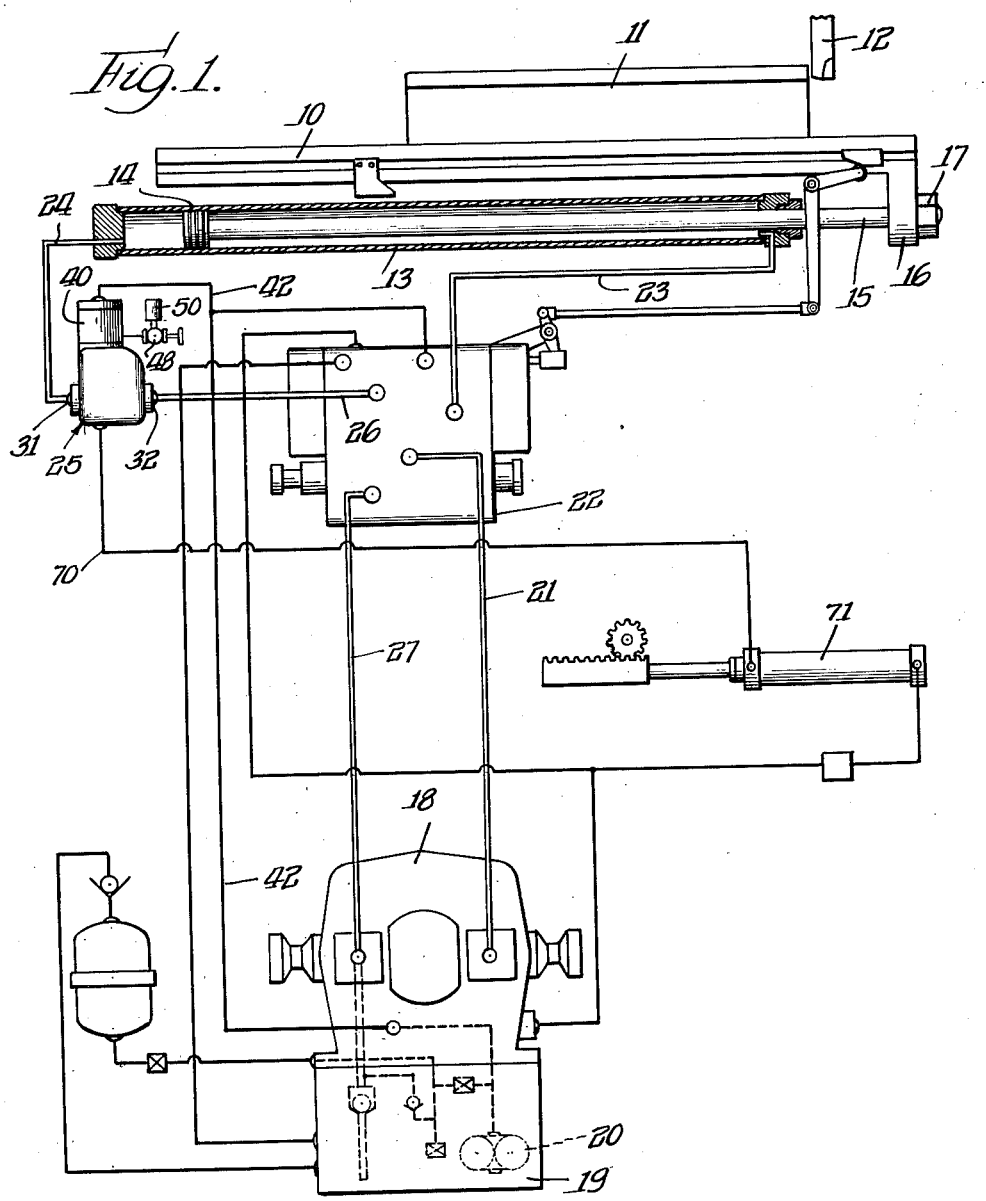

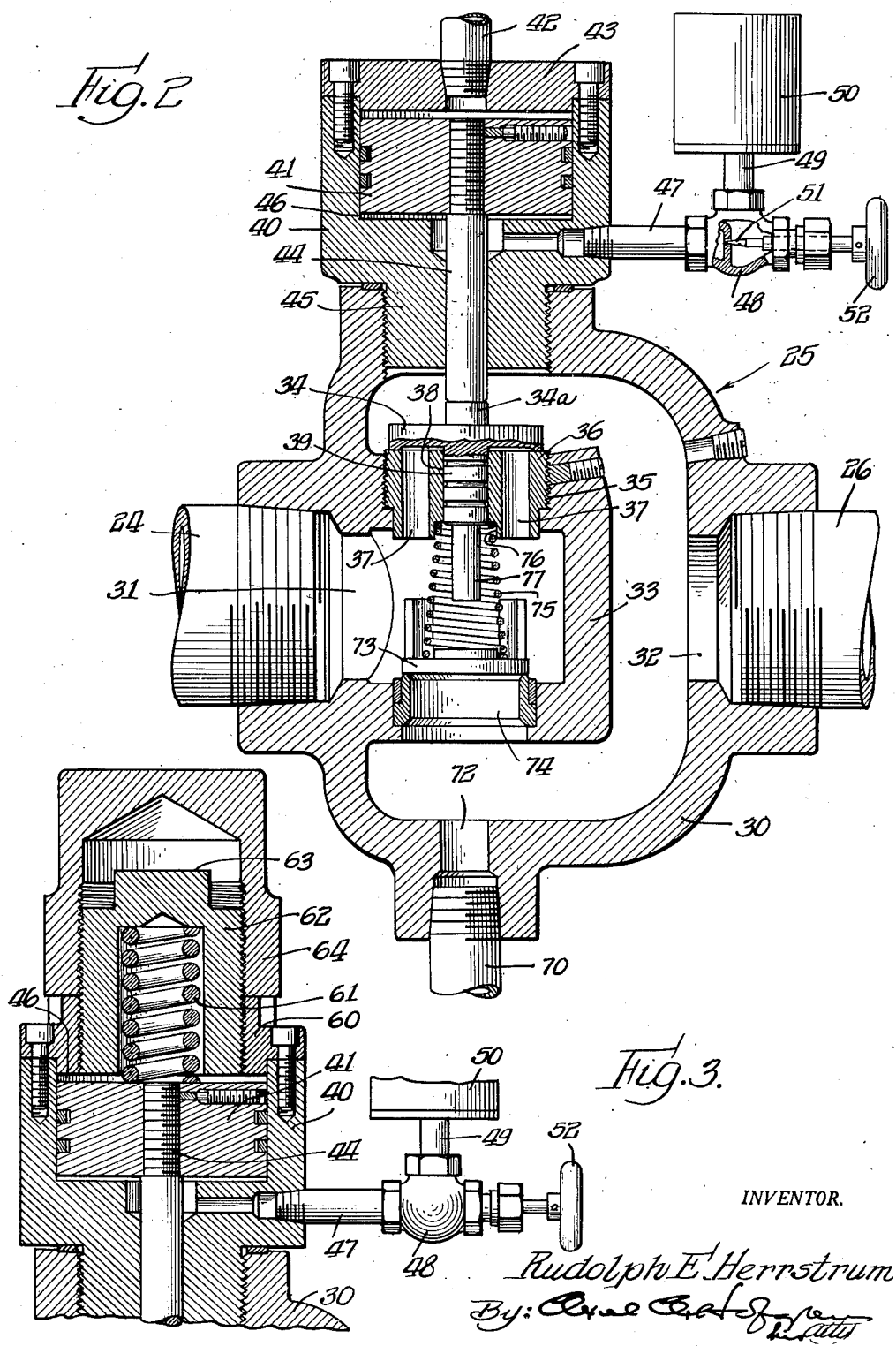

2,590,769

UNITED STATES PATENT OFFICE 2,590,769

BACK-PRESSURE VALVE FOR HYDRAULIC MACHINE TOOLS

Rudolph E. Herrstrum, Rockford, Ill., assignor to Rockford Machine Tool Company, Rockford, Ill., a corporation of Illinois Application August 30, 1943, Serial No. 500,545

2 Claims. (Cl. 137—153)

This invention relates to machine tools of the type having a support or table hydraulically operated by a piston and cylinder device which is included in a hydraulic circuit, and the invention is concerned with means arranged in said circuit to eliminate chatter of the table or support on its ways, especially when operated at low speeds. In such machines, including planers, shapers and milling machines, lubricating oil is commonly employed as the fluid medium in the hydraulic circuits, by which operation is effected, but the occasional presence of air in the oil sometimes prevents smooth operation of the reciprocating table or support. This is particularly troublesome with heavy loads operating at slow speeds, as from twenty feet and less per minute. Apparently, during heavy cuts at such low speeds, the air in the oil is compressed, to a certain extent, before the resistance of the oil on the work is overcome, whereupon the table lunges forward and the pressure of the oil suddenly drops, this cycle being repeated at a relatively high rate on light machines, and at a comparatively lower rate on heavy machines.

One object of this invention is to provide a new and improved back pressure valve for use in hydraulic circuits, and operable to eliminate such chatter of the driven table or support.

Another object of the invention is to provide a back pressure valve operative to restrict the flow of liquid away from the actuating cylinder during its working stroke, in order to maintain an effective and uniform back pressure, tending to steady the table and prevent objectionable chatter, in the event that uneven resistance is offered by the work itself.

It is a further object of the invention to provide a back pressure valve in a hydraulic circuit with yielding means urging the valve toward its closed position, and dash pot means operative to retard the action of such yielding means.

More specifically, it is an object of the invention to provide a back pressure valve with a piston and cylinder device affording pressure means controlling said valve, and with dash pot means controlling the action of the piston in its cylinder to avoid sudden opening of the back pressure valve and to effect only gradual movement thereof toward closed position in order to secure a relatively smooth operation of the table or support, notwithstanding variations in the resistance which the work offers to the cutting tool.

Other objects and advantages will appear more fully from the following description taken in connection with the drawings in which:

Fig. 1 is a diagrammatic view showing the essential portions of a machine and a hydraulic circuit for operating it, including a back pressure valve arranged in accordance with this invention.

Fig. 2 is a vertical sectional view showing one form of the back pressure valve.

Fig. 3 is a vertical sectional view similar to Fig. 2, showing a modified form of the back pressure valve.

While I have illustrated in the drawing, and shall hereinafter describe in detail, two specific forms of the invention, and have shown them diagrammatically as applied to a machine of the planer type, it is to be understood that I do not intend to limit the invention to the particular forms or to the arrangements shown, it being contemplated that various changes may be made by those skilled in the art without departing from the spirit and scope of the invention, as indicated by the appended claims.

As illustrated in the drawings, the reciprocatory table or support is indicated at 10 in Fig. 1, with the work-piece 11 thereon and a tool 12 disposed for operation on the work-piece. The table is arranged to be driven by means of a main piston and cylinder device, including a cylinder 13 with a piston 14 therein, having a piston rod 15 which is coupled to a depending portion or lug 16 on the table, by means including a securing nut 17.

The operating circuit includes a pump casing 18 and a tank or reservoir 19 on which the casing 18 is mounted, and which encloses a gear-type pump 20, indicated in dotted outline in Fig. 1, while the casing 18 may be understood as housing a variable displacement, piston-type pump. The pressure line 21 leads from the pump in the casing 18 through control mechanism, diagrammatically indicated at 22, and by way of a line 23 into one end of the cylinder 13. A return line 24 leads through the pressure control valve 25 and thence by way of a passage 26 through the control mechanism 22 and a return line 27 to the pump casing 18.

The back pressure valve shown at 25 may be constructed substantially as seen in Fig. 2, in which the valve body 30 includes an inlet 31 to which the pipe 24 is connected, and an outlet 32 from which the passage 26 leads. Within the valve body there is formed integrally therewith a partition 33 having an opening controlled by a valve member 34. As shown, the opening is threaded at 35 to receive an inserted valve seat member 36 which is formed with a plurality of ports 37 and with a centrally disposed guideway 38 for the stem 39 of the valve 34. The valve member 34 seats over the several ports 37 or opens them all simultaneously when it is unseated.

To control the action of the valve 34, and to hold it in seated position until the back pressure in the line 24 exceeds a predetermined limit, there is provided a cylinder 40 surmounting the valve body 30 and containing a piston 41. A pipe line 42 extends from the gear pump 29 to provide a constant holding pressure acting against the upper side of the piston 41 and under the head 43 of the cylinder 40 to hold the piston rod 44 of the piston 41 in abutting engagement with a central hub 34a on the valve member 34. As shown, the effective area of the piston 41 is about twice that of the valve 34, so that one hundred pounds per square inch of pressure on the piston will operate to hold the valve 34 closed until the pressure in the line 24 exceeds two hundred pounds per square inch. This limit is reached and approximately maintained during each working stroke of the piston 14 in the cylinder 13. However, if the tool 12 encounters a "hard spot" in the work, and is momentarily slowed down, the velocity of movement of the oil in the line 24 will be temporarily retarded, and the back pressure will drop, permitting the holding pressure on the piston 41 to force the valve 34 toward closed position, or, at least, nearer to seating position, to substantially maintain the back pressure in the line 24. Then, when the tool has passed the "hard spot," instead of lunging forward suddenly, it will tend to proceed at a more nearly uniform rate, by reason of the maintained back pressure in the cylinder 13 and in the line 24. As the normal velocity is resumed, the back pressure will tend to increase, forcing the valve 34 to open more widely in opposition to the resistance offered by the piston 41.

In order that the valve 34 shall not respond too promptly to the increase of pressure, and that it shall not be forced too suddenly toward its closed position, and perhaps beyond the position corresponding to the necessary restriction in cases in which the table movement is retarded by excessive resistance to the tool, the cylinder 40 is provided with a dash pot device operating to retard movement of the piston 41 in either direction. The cylinder 40 includes an end wall 45 which partitions the cavity of the cylinder 40 from the cavity of the valve body 30, this end wall having a bore through which the piston rod 44 extends slidably. A slight clearance space 46 between the piston and said end wall 45 is normally filled with liquid, such as oil, and into this space there is connected a pipe 47 leading to a valve fitting 48, from which a connecting pipe 49 extends to a small tank 50 containing a supply of such liquid. The fitting 48 contains a needle valve 51, adjustable by means of a valve handle 52 to provide a restricted passage connecting the space 46 with the oil supply at 50. Downward movement of the piston 41 is thus retarded because the oil in the space 46 must be forced out past the restricted opening afforded by the needle valve 51; and upward movement of the piston 41 is likewise retarded because it creates a suction or partial vacuum in the space 46 which tends to draw oil from the supply 50 past the restricted opening controlled by the needle valve 51. Thus, this suction effect tends to retard the opening of the valve 34 while the restricted expulsion of oil from the space 46 prevents the piston from acting too suddenly in the direction to close the valve 34.

As a result of this construction it has been found that chatter is effectively eliminated, and the working stroke is accomplished with a substantially smooth and uniform travel of the table in opposition to the resistance of the cutting tool.

As a modification of the back pressure valve, Fig. 3 shows a structure in which the valve body 30 is the same as shown in Fig. 2, with the valve 34 and its seat 36 substantially similar to the corresponding parts already described. With this arrangement, however, the cylinder 40 surmounting the valve body 30 is fitted with a threaded ring 60 in place of the cylinder head 43, and, instead of applying hydraulic pressure to the upper side of the piston 41, a heavy spring 61 is seated upon the piston, as seen in Fig. 3. A hollow plug 62 fits over the spring 61 and is screwed into the threaded ring 60, providing a stop for the outer end of the spring 51. The upper end of the plug 62 may be squared at 63 for engagement by a suitable wrench to adjust the plug 62 to a position at which the spring 61 is compressed, so as to provide the desired initial pressure acting through the piston 41 and its piston rod 44 against the valve 34. To enclose the plug 62, and also to maintain its adjusted position, a cap 64 is threaded to fit onto the upper end of the plug 62, and to be screwed down into abutting relation to the ring 60, thus acting as a lock nut to secure the adjustment of tension in the spring 61.

As shown in Fig. 1, the hydraulic circuit includes a return line 70 from the feed cylinder 71. Said line 70 enters the valve body 30 at 72, delivering return flow from the feed cylinder. This flow at a predetermined pressure opens the valve 73 seated over the port 74 in the partition 33. A spring 75 normally holds the valve 73 seated, and, as a convenient construction, the upper end of the spring reacts against a shoulder formed by a counterbore 76 in the valve seat member 36. The stem 39 of the valve 34 includes an extension 77 which projects into the upper portion of the spring 75 and acts as a guard to prevent it from becoming dislocated. The reverse flow, from the right-hand end of the main cylinder 13, also passes the valve 73 as the oil is forced from cylinder 13 during its return stroke and flows through the line 23 to the control center 22 and thence, by way of the line 26, enters the valve body 30 at 32. Since the valve 34 is not actually connected to the stem 44 of the piston 41, this valve will be free to close promptly under pressure of the reverse flow entering at 32 even if the action of the needle valve 51 should retard the downward movement of the piston 41. Thus the reverse flow through the valve body 30 will take place entirely through the port 74 and past the spring seated valve 73.

I claim as my invention:

1. A back pressure valve comprising a valve casing having an inlet and an outlet, a partition disposed between the inlet and outlet with an opening in said partition, a valve seat removably secured in said opening having a plurality of ports and a central guideway between said ports, a valve member dimensioned to seat over said ports and having a central stem slidably fitted in said guideway, and pressure means yieldingly urging said valve member toward seated position including a piston in a cylinder, a piston rod extending between said piston and said valve, a liquid supply connected to the piston rod end of said cylinder and means forming a restricted orifice for the passage of liquid between said source of supply and said cylinder, said partition having a return port in axial alignment with said valve, a second valve for said return port, a spring normally seating said second valve reacting between the same and under side of the seat of the first valve, and means for connecting a fluid under pressure with the interior of said valve casing on the outlet side of the partition.

2. A back pressure valve comprising a valve casing having an inlet and an outlet, a partition disposed between the inlet and outlet with an opening in said partition, a valve seat in said opening, a valve member on the outlet side of the opening and dimensioned to seat on the valve seat, a cylinder having means forming a chamber at each end thereof, a piston reciprocably mounted in the cylinder, a piston rod connecting the piston to the valve, means for introducing fluid under pressure to the chamber at the head end of the piston yieldably to urge the valve toward seated position, a liquid reservoir, a passage connecting the reservoir only to the chamber at the rod end of the piston, and a flow metering orifice in the passage to dampen movement of the piston in response to said fluid pressure and in response to variations in inlet pressure.

RUDOLPH E. HERRSTRUM.

REFERENCES CITED

The following references are of record in the file of this patent:

UNITED STATES PATENTS

| Number | Name | Date |
|---|---|---|
| 417,329 | Marsh | Dec. 17, 1889 |
| 958,705 | Mesta | May 17, 1910 |
| 965,052 | Wainwright | July 19, 1910 |
| 1,022,556 | Johnson | Apr. 9, 1912 |
| 1,046,884 | Spencer | Dec. 10, 1912 |
| 1,140,565 | Belknap | May 25, 1915 |
| 1,400,411 | Booth | Dec. 13, 1921 |
| 1,405,525 | LeCain | Feb. 7, 1922 |
| 1,507,448 | Aldrich | Sept. 2, 1924 |
| 1,509,508 | Grunwald | Sept. 23, 1924 |
| 1,560,439 | Trenor | Nov. 3, 1925 |
| 2,110,534 | Snow | Mar. 8, 1938 |
| 2,226,022 | Shutts | Dec. 24, 1940 |
| 2,227,629 | Cannon | Jan. 7, 1941 |
| 2,328,980 | Herman | Sept. 7, 1943 |
| 2,330,447 | Posey | Sept. 28, 1943 |

FOREIGN PATENTS

| Number | Country | Date |
|---|---|---|
| 847,080 | France | of 1939 |